US008693642B2

(12) United States Patent
Brusilovsky et al.

(10) Patent No.: US 8,693,642 B2
(45) Date of Patent: Apr. 8, 2014

(54) EMERGENCY CALL HANDLING IN ACCORDANCE WITH AUTHENTICATION PROCEDURE IN COMMUNICATION NETWORK (75) Inventors: Alec Brusilovsky, Naperville, IL (US); Frank Alfano, Wheaton, IL (US)

(73) Assignee: Alcatel Lucent, Paris (FR)

( * ) Notice: Subject to any disclaimer, the term of this patent is extended or adjusted under 35 U.S.C. 154(b) by 1342 days.

(21) Appl. No.: 12/437,276

(22) Filed: May 7, 2009

(65) Prior Publication Data

US 2010/0266107 A1 Oct. 21, 2010

Related U.S. Application Data (60) Provisional application No. 61/169,929, filed on Apr. 16, 2009.

(51) Int. Cl.
*H04M 11/04* (2006.01)
(52) U.S. Cl.
USPC .......................................... 379/46; 455/404.1
(58) Field of Classification Search
USPC ............. 379/33, 36–48, 142; 455/404.1, 412, 455/404.2, 411
See application file for complete search history.

(56) References Cited

U.S. PATENT DOCUMENTS

2007/0049245 A1* 3/2007 Lipman ........................ 455/406
2007/0060097 A1* 3/2007 Edge et al. .................. 455/404.1
2007/0123208 A1   5/2007 Batta et al.
2008/0009262 A1   1/2008 Rudolf et al.
2009/0305671 A1* 12/2009 Luft et al. ..................... 455/411
2010/0159990 A1*  6/2010 Johnstone .................... 455/561

FOREIGN PATENT DOCUMENTS

| GB | 2437346 A | 10/2007 |
| JP | H05167532 A | 7/1993 |
| JP | 2009537108 A | 10/2009 |
| WO | PCT/US2010/030716 | 2/2011 |

OTHER PUBLICATIONS

"3rd Generation Partnership Project; Technical Specification Group Services and System Aspects; Support for Internet Protocol (IP) Based IP Multimedia Subsystem (IMS) Emergency Calls Over General Packet Radio Service (GPRS) and Evolved Packet Service (EPS) (Release 9)," 3GPP Standard, 3GPP TR 23.869, Mar. 2009, pp. 1-35, No. V9.0.0.

(Continued)

*Primary Examiner* — Fan Tsang
*Assistant Examiner* — Akelaw Teshale
(74) *Attorney, Agent, or Firm* — Ryan, Mason & Lewis, LLP (57) ABSTRACT Techniques are provided for handling of an emergency call as it affects an authentication procedure in a communication network. For example, it is assumed that, in a communication network, a first computing device comprises user equipment and a second computing device comprises an authentication function. Thus, a method comprises the following steps. A first type call indicator message is received at the second computing device from the first computing device. A decision is made to proceed with or drop an authentication procedure for the first computing device at the second computing device based on the first type call indicator message. The second computing device may enable a first type call to be placed for the first computing device. The first type call may be an emergency call.

18 Claims, 4 Drawing Sheets

(56) References Cited

OTHER PUBLICATIONS

Alcatel-Lucent et al., "Addition of EC Clauses to the Rel-9 TS 33.401," 3GPP Draft, S3-091073 33.401 EC-Related Clauses Added Delta, 3rd Generation Partnership Project (3GPP), Mar. 2009, 10 pages.

3rd Generation Partnership Project, Technical Specification Group Services and System Aspects, "General Packet Radio Service (GPRS) Enhancements for Evolved Universal Terrestrial Radio Access Network," E-UTRAN Access, Release 8, 3GPP TS 23.401, Version 8.1.0, Mar. 2008, 171 pages.

3rd Generation Partnership Project, Technical Specification Group Services and System Aspects, "Architecture Enhancements for Non-3GPP Accesses," Release 8, 3GPP TS 23.402, Version 8.0.0, Dec. 2007, 131 pages.

3rd Generation Partnership Project, Technical Specification Group Core Network and Terminals, "Characteristics of the Universal Subscriber Identity Module (USIM) Application," Release 7, 3GPP TS 31.102, Version 7.3.0, Dec. 2005, 177 pages.

3rd Generation Partnership Project, Technical Specification Group Core Network and Terminals, "Characteristics of the IP Multimedia Services Identity Module (ISIM) Application," Release 5, 3GPP TS 31.103, Version 5.10.0, Jun. 2005, 26 pages.

3rd Generation Partnership Project, Technical Specification Group Services and System Aspects, "3G Security, Security Architecture," 3G TS 33.102, Version 3.1.0, Jul. 1999, 57 pages.

3rd Generation Partnership Project, Technical Specification Group Core Network, "NAS Functions Related to Mobile Station (MS) in Idle Mode," Release 5, 3GPP TS 23.122, Version 5.0.0, Jun. 2002, 34 pages.

* cited by examiner

EMERGENCY CALL HANDLING IN ACCORDANCE WITH AUTHENTICATION PROCEDURE IN COMMUNICATION NETWORK

CROSS REFERENCE TO RELATED APPLICATION

The present application claims priority to the U.S. Provisional Patent Application identified as Ser. No. 61/169,929, filed on Apr. 16, 2009, the disclosure of which is incorporated by reference herein in its entirety.

FIELD OF THE INVENTION

The present invention relates generally to communication networks, and more particularly to communication networks wherein provision is made for handling of an emergency call as it affects an authentication procedure.

BACKGROUND

This section introduces aspects that may help facilitate a better understanding of the inventions. Accordingly, the statements of this section are to be read in this light and are not to be understood as admissions about what is prior art or what is not prior art.

According to the International Telecommunication Union-Telecommunication Standardization Sector (ITU-T), by way of example, a Next Generation Network (NGN) is a packet-based network able to provide services including telecommunication services and able to make use of multiple broadband, quality-of-service (QoS)-enabled transport technologies and in which service-related functions are independent from underlying transport-related technologies. It may offer unrestricted access by users to different service providers. It may support generalized mobility which may allow consistent and ubiquitous provision of services to users.

Consistent with NGN development efforts, Long Tern Evolution (LTE) is a Third Generation Partnership Project (3GPP) with an aim of trying to improve the Universal Mobile Telecommunications System (UMTS) mobile phone standard and to provide an enhanced user experience and simplified technology for next generation mobile broadband. LTE radio access technology has been referred to as Evolved UMTS Terrestrial Radio Access Network (E-UTRAN) and the network has been referred to as an Evolved Packet System (EPS). Architecture of the EPS network is described in the 3GPP Technical Specifications 23.401 and 23.402, the disclosures of which are incorporated herein by reference in their entirety.

SUMMARY

Embodiments of the invention provide techniques for handling of an emergency call as it affects an authentication procedure in a communication network.

In a first aspect, wherein it is assumed that, in a communication network, a first computing device comprises user equipment and a second computing device comprises an authentication function, a method comprises the following steps.

A first type call indicator message is received at the second computing device from the first computing device. A decision is made to proceed with or drop an authentication procedure for the first computing device at the second computing device based on the first type call indicator message. The second computing device may enable a first type call to be placed for the first computing device. The first type call may be an emergency call.

In one or more illustrative embodiments, the authentication procedure may comprise: sending in accordance with a first authentication attempt an authentication request from the second computing device to the first computing device; receiving at the second computing device from the first computing device an authentication failure message, the authentication failure message being sent by the first computing device in response to the authentication request sent by the second computing device; and initiating at the second computing device a second authentication attempt in response to the authentication failure message; such that the second authentication attempt is ceased at the second computing device in response to the first type call indicator message. The second authentication attempt may comprise a re-synchronization procedure.

The communication network may comprise an Evolved Packet System (EPS) architecture, wherein the first computing device comprises Mobile Equipment (ME) and a UMTS Subscriber Identity Module (USIM), and the second user device comprises a Mobility Management Entity (MME). The authentication procedure may comprise an Authentication and Key Agreement (AKA) protocol.

Advantageously, illustrative embodiments of the invention provide improved performance of packet-based emergency call setup in an LTE environment.

These and other features and advantages of the present invention will become more apparent from the accompanying drawings and the following detailed description.

DETAILED DESCRIPTION OF THE INVENTION

Figure 1:
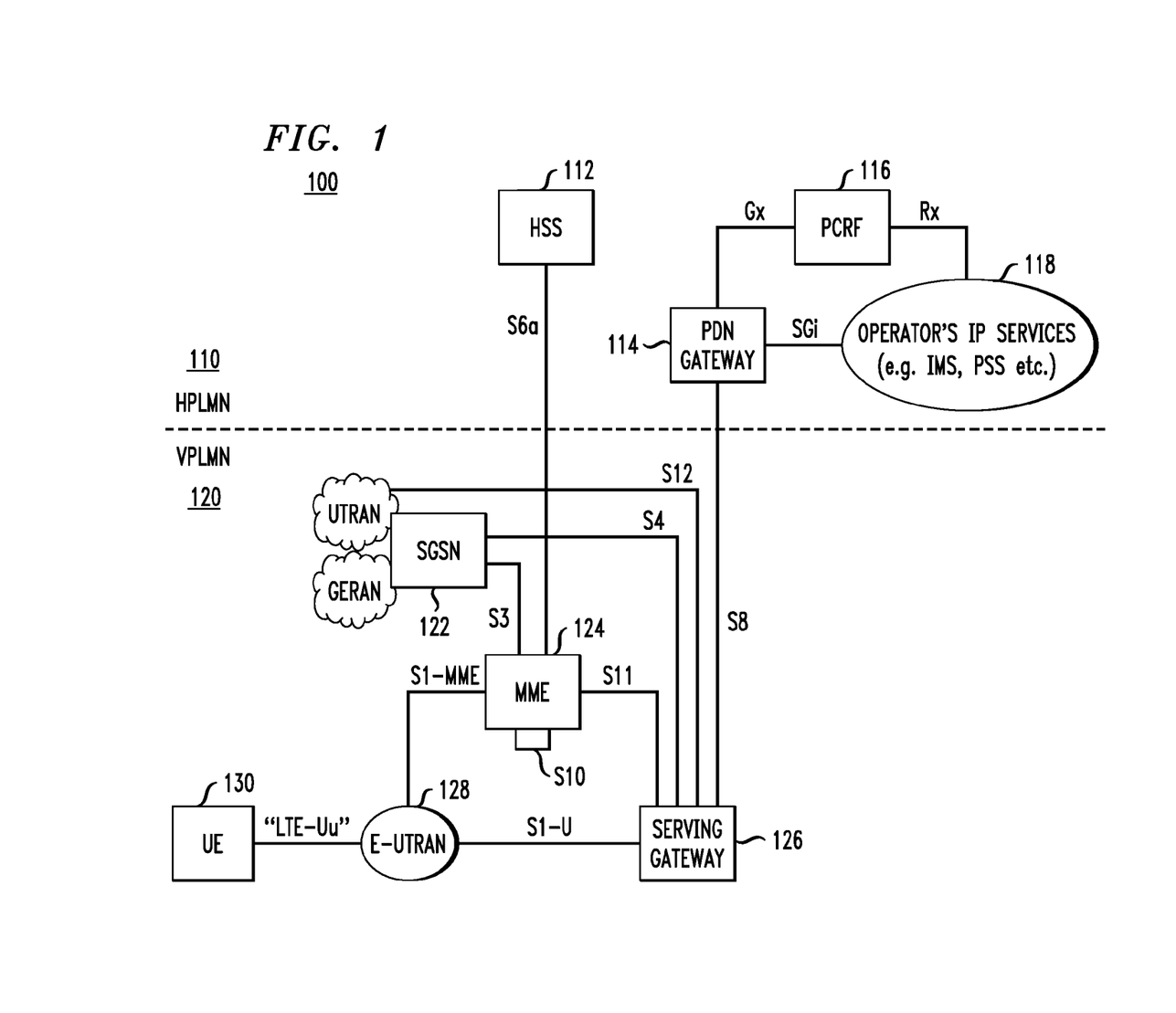
FIG. 1 is a diagram of a mobile roaming architecture according to an embodiment of the invention.

An embodiment of an LTE (or EPS) roaming architecture 100 is depicted in FIG. 1. As shown, the architecture 100 includes a Home Public Land Mobile Network (HPLMN) 110 and a Visited Public Land Mobile Network (VPLMN) 120.

In HPLMN 110, there is illustratively shown a Home Subscriber Server (HSS) 112, a packet data network (PDN) gateway server 114, a policy and charging rules function (PCRF) server 116, and network operator's Internet Protocol (IP) services 118. These IP services may include but are not limited to IP Multimedia Subsystem (IMS), a Packet Switching System (PSS), etc. As used herein, a "network operator" (or "telecom operator") may be defined as a company that owns and operates a telecommunications network and thus provides services (IMS, PSS, etc.) to subscribers, e.g., an NGN operator is a network operator that owns and operates an NGN network. Thus, two defining features of a network operator may be: (1) owning the network; and (2) providing services to subscribers, for a charge. A third feature may be that the network operators are typically regulated, which may make them legally responsible for ensuring privacy of communications, etc. Examples of network operators may include, by way of example only, AT&T or Verizon.

In VPLMN 120, there is illustratively shown Serving GPRS Support Node (SGSN) 122 (where GPRS refers to a General Packet Radio Service) for legacy networks such as but not limited to GSM Edge Radio Access Network (GE-RAN, where GSM refers to a Global System for Mobile communications) and UTRAN (UMTS Terrestrial Radio Access Network). Also illustratively shown is Mobility Management Entity (MME) 124, serving gateway 126, E-UTRAN (Evolved UTRAN network) 128, and User Equipment 130.

The serving gateway 126 is a local mobility anchor for E-UTRAN mobility, switching packets between interfaces for mobiles in connected mode. For mobiles in idle mode, the serving gateway 126 is responsible for terminating the down-link data path and when down-link data is received, buffering the data and triggering a paging procedure by signaling the MME 124.

The MME 124 is the control-plane function for E-UTRAN access. It is responsible for authentication and critical management for mobile devices as well as for tracking and paging procedures for mobiles in idle mode.

The UE 130 (or Mobile Station (MS)) is composed of Mobile Equipment (ME) and UMTS Subscriber Identity Module (USIM). Examples of mobile station or user equipment may include but are not limited to a mobile telephone, a portable computer, a wireless email device, a personal digital assistant (PDA) or some other user mobile communication device.

The E-UTRAN 128 is composed of access nodes including at least one eNodeB (eNB) node, which serves as a base station for the UEs to access the VPLMN network.

In one embodiment, UE 130 (ME+USIM), eNodeB (E-UTRAN 128), MME 124, and HSS 112 are the network elements affected by illustrative principles of the invention, as will be explained below in detail.

Thus, it is to be understood that UE (User Equipment) is ME (Mobile Equipment)+USIM. USIM is a software and file system located on the physical device UICC (which is a Universal Integrated Circuit Card, commonly known as the "SIM card" in a mobile phone). UICC is a tamper-resistant Smart Card. USIM terminates AKA (Authentication and Key Agreement), an authentication and key agreement protocol (cited below) standardized by 3GPP. UMTS and EPS use similar versions of AKA.

This is how a successful AKA procedure typically operates:

1. Upon initial attach, UE sends its attach request with International Mobile Subscriber Identity (IMSI) in it to eNodeB (cell site, part of E-UTRAN).
2. eNodeB forwards it to MME, the MME looks at the routing labels in the IMSI and knows where the UE's home system with its HSS is located.
3. MME forwards a request message with IMSI in it to that HSS.
4. HSS does certain calculations: selects random # RAND, uses RAND and shared with USIM root key K to calculate authentication token AUTN, XRES (Expected Response), and another root key $K_{ASME}$.
5. HSS than replies to MME with AKA AV (Authentication Vector). EPS AV has the following parameters: RAND, AUTN, XRES, and $K_{ASME}$.
6. When MME receives EPS AV, it holds on to XRES and $K_{ASME}$, and forwards RAND and AUTN through eNodeB and ME to the USIM.
7. The first thing that USIM does is authenticate AUTN, and ONLY after its successful authentication, USIM calculates RES and its own $K_{ASME}$.
8. Then USIM sends root key $K_{ASME}$ to ME for derivation of the other EPS keys, and sends RES through ME and eNodeB to the MME.

MME compares RES (received from the USIM) with XRES (received from the HSS). If they are equal to each other, then USIM (and USIM+ME=UE) is accepted to the serving network.

Accordingly, in one embodiment, the UE is assumed to support an application protocol that is aware of the Authentication and Key Agreement (AKA) algorithm. Furthermore, in this illustrative embodiment, the UE is assumed to support a UMTS Subscriber Identity Module (USIM) application that implements the AKA algorithm. Details on USIM applications may be found in 3GPP Technical Specifications TS 31.102 and TS 31.103, the disclosures of which are incorporated by reference herein in their entirety. Details on AKA may be found in is 3GPP Technical Specification TS 33.102, the disclosure of which is incorporated by reference herein in its entirety.

While this particular embodiment utilizes aspects of a 3GPP authentication protocol, it is to be understood that such a protocol is one example of a security protocol that may be used. Thus, other suitable security protocols that provide similar facilities and features as the 3GPP authentication protocol may be considered as being within the scope of embodiments of the invention.

The E-UTRAN Initial Attach procedure is used for Emergency Attach by UEs that need to perform emergency services but cannot gain normal services from the network. These UEs are in limited service state (Limited Service Mode or LSM) as defined in 3GPP Technical Specification TS 23.122 ("Non-Access-Stratum (NAS) functions related to Mobile Station (MS) in idle mode"), the disclosure of which is incorporated by reference herein in its entirety.

UEs that can attach normally to a cell, i.e., UEs that are not in limited service state, shall initiate normal initial attach when not already attached.

Figure 2:
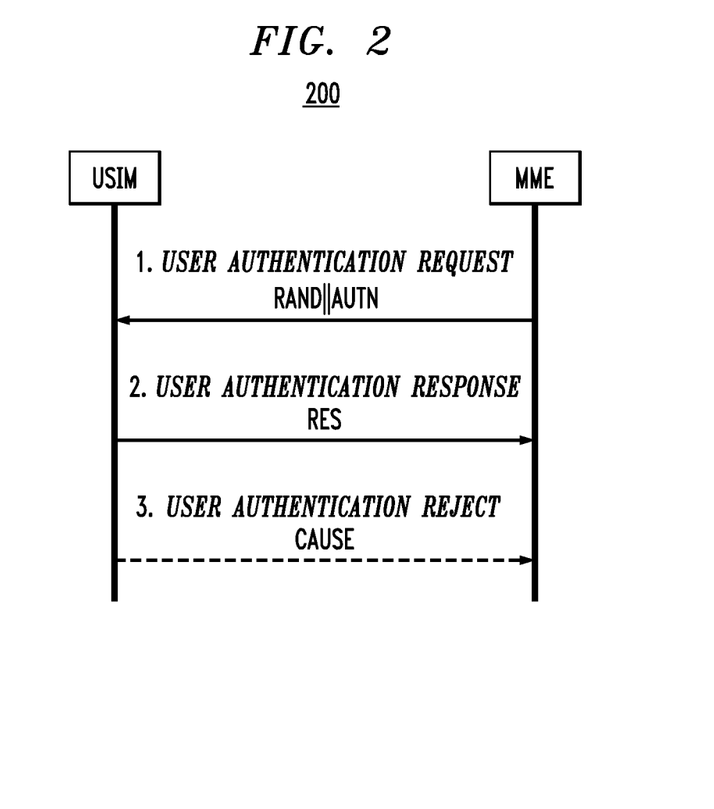
FIG. 2 is a diagram of an authentication procedure according to an embodiment of the invention.

FIG. 2 depicts an illustrative authentication and key establishment procedure 200, e.g., Authentication and Key Agreement (AKA) procedure or protocol. The purpose of the AKA procedure is to authenticate the user and establish a new root key $K_{ASME}$ between the MME and the USIM. During the authentication, the USIM verifies the freshness of the authentication vector that is used.

It is to be understood that the messages sent between the entities shown in FIG. 2 (and in FIGS. 3 and 4 to be described below) are signals that are transmitted and received in accordance with the one or more communication protocols that are implemented by the entities. It is also to be understood that the sequence of the message transfers can be rearranged or modified (with some additional messages being added and/or some being deleted) while still providing one or more of the advantages attributable to the principles of the invention.

The MME invokes the procedure by selecting the authentication vector (AV). The MME 124 sends to the USIM (UE 130) the random challenge RAND and an authentication token for network authentication AUTN from the authentication vector. This is shown in step 1 of FIG. 2

In step 2 of FIG. 2, the USIM sends a response to the random challenge back to the MME in the form of an authentication response RES. Assuming an appropriate response, authentication proceeds as normal (i.e., as described above).

However, assuming a synchronization failure, the UE 130 sends a synchronization failure message (user authentication reject CAUSE message in step 3 of FIG. 2) to the MME 124 rather than the appropriate response.

Upon receiving a synchronization failure message from the UE, the MME sends an authentication data request with a "synchronization failure indication" to the HSS 112, together with the parameters:

RAND sent to the MS in the preceding user authentication request, and

AUTS received by the MME in the response to that request, as described in TS 33.102.

Figure 3:
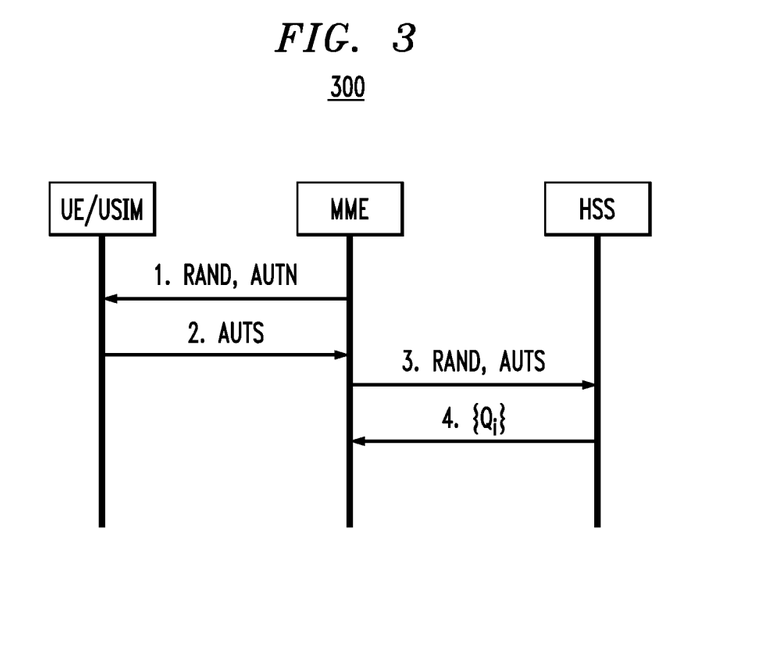
FIG. 3 is a diagram of a re-synchronization procedure according to an embodiment of the invention.

This is depicted in FIG. 3, which depicts a procedure 300 for achieving re-synchronization by combining a user authentication request answered by a synchronization failure message with an authentication data request with synchronization failure indication answered by an authentication data response.

As shown, after step 1 (MME sends challenge) and step 2 (UE sends a AUTS response), the MME sends RAND and AUTS to HSS in step 3.

Note that the MME 124 will not react to unsolicited "synchronization failure indication" messages from the UE 130.

Note also that the MME 124 does not send new user authentication requests to the user before having received the response to its authentication data request from the HSS 112 (or before it is timed out).

When the HSS 112 receives (in step 3 of FIG. 3) an authentication data request with a "synchronization failure indication," it acts as follows:

1. The HSS retrieves $SQN_{MS}$ from $Conc(SQN_{MS})$ by computing $Conc(SQN_{MS}) \oplus f5^*_K(RAND)$. Note that SQN refers to Sequence Number and 'Conc' refers to concatenation function.
2. The HSS checks if $SQN_{HE}$ is in the correct range, i.e., if the next sequence number generated $SQN_{HE}$ using would be accepted by the USIM.
3. If $SQN_{HE}$ is in the correct range then the HSS continues with step (6) below, otherwise it continues with step (4) below.
4. The HSS verifies AUTS.
5. If the verification is successful, the HSS resets the value of the counter $SQN_{HE}$ to $SQN_{MS}$.
6. The HSS sends an authentication data response with a new batch of authentication vectors to the MME ($Q_i$ in step 4 of FIG. 3). If the counter $SQN_{HE}$ was not reset, then these authentication vectors can be taken from storage, otherwise they are newly generated after resetting $SQN_{HE}$. In order to reduce the real-time computation burden on the HSS, the HSS may also send only a single authentication vector in the latter case.

Whenever the MME 124 receives a new authentication vector from the HSS 112 in an authentication data response to an authentication data request with synchronization failure indication, it deletes the old one for that UE 130 in the MME.

The UE 130 may now be authenticated based on a new authentication vector from the HSS 112.

A problem may arise, however, during the course of the above authentication session. Assume that the UE 130 is in need of making an Emergency Call (EC) while in the middle of AKA (re-)authentication and, for one or more reasons, AUTN validation on the USIM fails (user authentication reject CAUSE in FIG. 2).

Under normal conditions (see, e.g., the above cited TS 33.102), the UE 130 will either request new AKA authentication upon MAC (Media Access Control) authentication failure, or will enter AUTS procedure (re-synchronization with its HSS) upon SQN mismatch. In such cases, the MME 124 will not receive RES and UE 130 will not produce $K_{ASME}$.

In other words, the UE 130 will wait for either new AKA (MAC failure), or resynchronization with HSS and new AKA after that. New AKA round-trip can be up to about 10-15 seconds, and resynchronization with HSS might take about the same time. In the worst case, the UE 130 will have to wait about 30 seconds to be able to proceed with the intended call. The MME 124 can neither control re-synchronization time, nor estimate it for communicating to the UE 130 intending to make emergency call. It is realized that this feature interaction may be unacceptable and/or unnecessary for such emergency calling.

Figure 4:
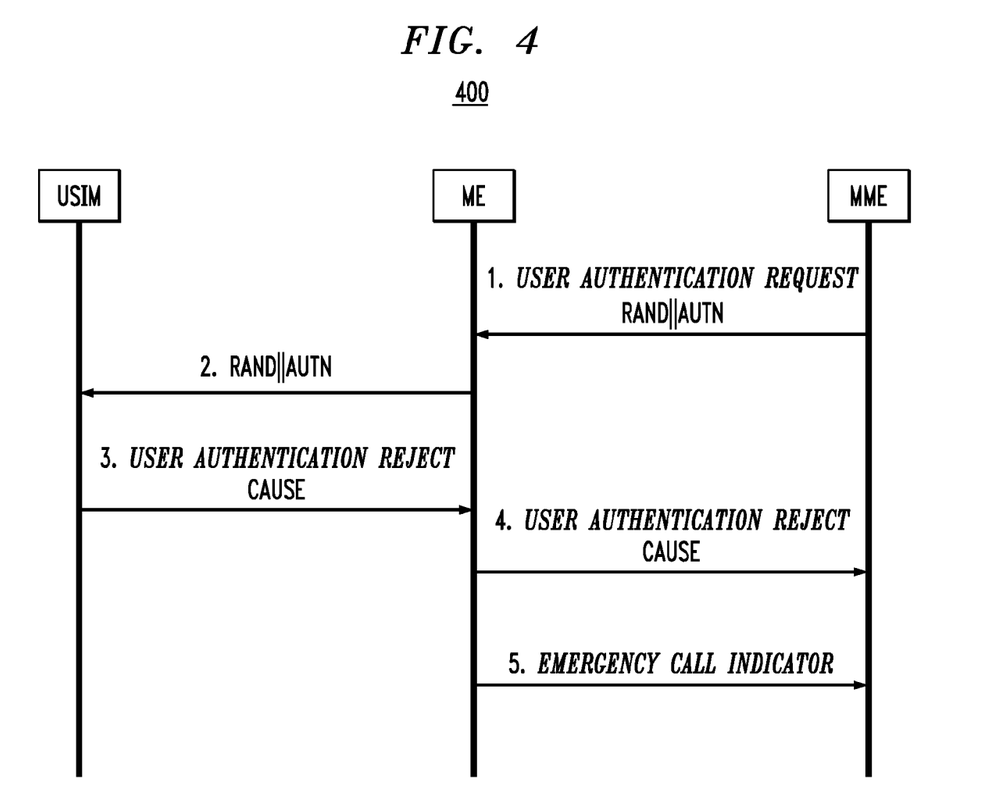
FIG. 4 is a diagram of an emergency call handling procedure according to an embodiment of the invention.

In accordance with one embodiment, a solution is provided as follows. FIG. 4 illustrates a procedure 400 for implementing such a solution.

It is realized that since the ME of the UE 130 (note that, as explained above, the ME is part of the UE 130 but functionally separate from the USIM) knows of the intent to make an emergency call, the ME can communicate its intent via an Emergency Call (EC) Indicator to the MME 124.

Assume, as shown in FIG. 4, that the MME sends user authentication request in step 1 to the ME (of the UE), which then forwards request in step 2 to the USIM (also of the UE). Further assume that upon receiving Authentication Failure from the USIM (step 3), the ME forwards it to the MME (step 4) and will stop expecting a new AKA, or re-synchronization+new AKA. Instead, it will assume unauthenticated attach mode and proceed with such mode.

On the network side, the MME 124 will know of the UE's intent to make an EC via EC Indicator sent in step 5. Upon receiving Authentication Failure from the UE, the MME will stop following the normal authentication/re-synchronization procedure (outlined above in FIGS. 2 and 3). Instead, the MME will assume unauthenticated attach mode and proceed with such mode. The MME will allow only the EC to go through.

Note that since the EC indicator message in the example above is sent after the authentication failure message is received by the MME, the authentication procedure may advantageously be ceased or dropped. Alternatively, the EC indicator message may be received earlier in the same authentication session but before authentication actually begins, in which case, the authentication procedure may advantageously not be initiated or dropped altogether. Thus, it is to be appreciated that the EC indicator message, whenever it is received in the session, may advantageously serve to permit the MME to make a decision regarding the authentication procedure (e.g., whether to drop or proceed).

In any case, after the EC call ends, both parties (UE and MME) reset themselves to a normal authentication procedure. It is the presence of EC Indicator that essentially controls ME and MME behavior during authentication failure while attempting to make the EC.

For an Emergency Attach, the ME of the UE sets the Attach Type to "Emergency" and proceeds with an unauthenticated Emergency Call.

If the MME 124 is configured to support Emergency Attach and the UE indicated Attach Type "Emergency," the MME skips the authentication and security setup or the MME accepts that the authentication may fail and continues the attach procedure.

If the MME 124 is not configured to support Emergency Attach, the MME rejects any Attach Request that indicates Attach Type "Emergency."

Figure 5:
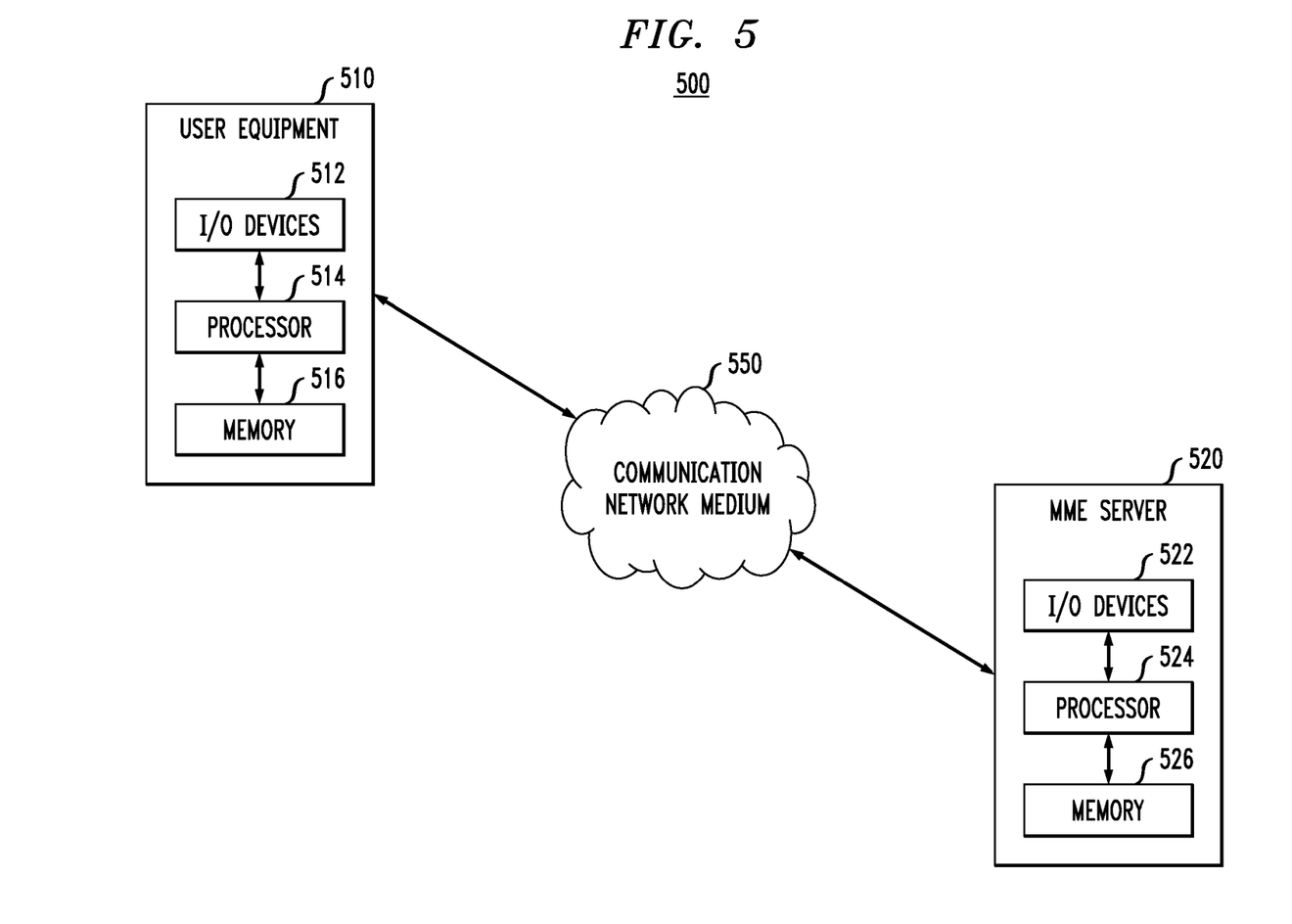
FIG. 5 is a diagram of a hardware architecture of a communication network suitable for implementing authentication and emergency call services according to an embodiment of the invention.

Lastly, FIG. 5 illustrates a generalized hardware architecture of a communication network 500 suitable for implementing authentication and emergency call handling services according to the above-described principles of the invention.

As shown, user equipment 510 (corresponding to UE 130) and MME server 520 (corresponding to MME 124) are operatively coupled via communication network medium 550. The network medium may be any network medium across which the user equipment and the web servers desire to communicate. By way of example, the network medium can carry IP packets end to end and may involve any of the communication networks mentioned above. However, the invention is not limited to a particular type of network medium. Typically, user equipment 510 could be a client machine or device, and MME 520 could be a server machine or device. Not expressly show here, but understood to be operatively coupled to the MME and/or the UE, are the other network elements shown in FIG. 1 (which can have the same processor/memory configuration described below).

As would be readily apparent to one of ordinary skill in the art, the servers and clients may be implemented as programmed computers operating under control of computer program code. The computer program code would be stored in a computer (or processor) readable storage medium (e.g., a memory) and the code would be executed by a processor of the computer. Given this disclosure of the invention, one skilled in the art could readily produce appropriate computer program code in order to implement the protocols described herein.

Nonetheless, FIG. 5 generally illustrates an exemplary architecture for each device communicating over the network medium. As shown, user equipment 510 comprises I/O devices 512, processor 514, and memory 516. MME server 520 comprises I/O devices 522, processor 524, and memory 526.

It should be understood that the term "processor" as used herein is intended to include one or more processing devices, including a central processing unit (CPU) or other processing circuitry, including but not limited to one or more signal processors, one or more integrated circuits, and the like. Also, the term "memory" as used herein is intended to include memory associated with a processor or CPU, such as RAM, ROM, a fixed memory device (e.g., hard drive), or a removable memory device (e.g., diskette or CDROM). In addition, the term "I/O devices" as used herein is intended to include one or more input devices (e.g., keyboard, mouse) for inputting data to the processing unit, as well as one or more output devices (e.g., CRT display) for providing results associated with the processing unit.

Accordingly, software instructions or code for performing the methodologies of the invention, described herein, may be stored in one or more of the associated memory devices, e.g., ROM, fixed or removable memory, and, when ready to be utilized, loaded into RAM and executed by the CPU. That is, each computing device (510 and 520) shown in FIG. 5 may be individually programmed to perform their respective steps of the protocols depicted in FIGS. 2 through 4.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method, comprising:
   in a communication network wherein a first computing device comprises user equipment and a second computing device comprises an authentication function for authenticating the user equipment;
   receiving at the second computing device from the first computing device an authentication rejection message;
   receiving at the second computing device from the first computing device an emergency call indicator message; and
   making a decision at the second computing device regarding proceeding with or dropping an authentication procedure for the first computing device based on the receipt of the authentication rejection message and the emergency call indicator message.

2. The method of claim 1, further comprising the second computing device enabling an emergency call to be placed for the first computing device.

3. The method of claim 1, wherein the authentication procedure comprises:
   sending in accordance with a first authentication attempt an authentication request from the second computing device to the first computing device;
   receiving at the second computing device from the first computing device an authentication failure message, the authentication failure message being sent by the first computing device in response to the authentication request sent by the second computing device; and
   initiating at the second computing device a second authentication attempt in response to the authentication failure message;
   wherein the second authentication attempt is ceased at the second computing device in response to the emergency call indicator message.

4. The method of claim 3, wherein the second authentication attempt comprises a re-synchronization procedure.

5. The method of claim 1, wherein the communication network comprises an Evolved Packet System (EPS) architecture.

6. The method of claim 5, wherein the first computing device comprises Mobile Equipment (ME) and a UMTS Subscriber Identity Module (USIM).

7. The method of claim 5, wherein the second user device comprises a Mobility Management Entity (MME).

8. The method of claim 1, wherein the authentication procedure comprises an Authentication and Key Agreement (AKA) protocol.

9. An article of manufacture comprising a non-transitory processor-readable storage medium storing one or more software programs which when executed by a processor associated with the second computing device perform the steps of the method of claim 1.

10. An apparatus, comprising:
    in a communication network wherein a first computing device comprises user equipment and a second computing device comprises an authentication function for authenticating the user equipment, the second computing device comprising:
    a memory; and
    a processor coupled to the memory and configured to: receive from the first computing device an authentication rejection message; receive from the first computing device an emergency call indicator message; and make a decision at the second computing device regarding proceeding with or dropping an authentication procedure for the first computing device based on the receipt of the authentication rejection message and the emergency call indicator message.

11. The apparatus of claim 10, wherein the processor is further configured to enable an emergency call to be placed for the first computing device.

12. The apparatus of claim 10, wherein the communication network comprises an Evolved Packet System (EPS) architecture.

13. The apparatus of claim 12, wherein the first computing device comprises Mobile Equipment (ME) and a UMTS Subscriber Identity Module (USIM).

14. The apparatus of claim 12, wherein the second user device comprises a Mobility Management Entity (MME).

15. The apparatus of claim 10, wherein the authentication procedure comprises an Authentication and Key Agreement (AKA) protocol.

16. A method, comprising:
in a communication network wherein a first computing device comprises user equipment and a second computing device comprises an authentication function for authenticating the user equipment;
sending from the first computing device to the second computing device an authentication rejection message;
sending from the first computing device to the second computing device an emergency call indicator message; and
initiating an emergency call by the first computing device in response to a decision at the second computing device regarding proceeding with or dropping an authentication procedure for the first computing device at the second computing device based on the receipt of the authentication rejection message and the emergency call indicator message.

17. An article of manufacture comprising a non-transitory processor-readable storage medium storing one or more software programs which when executed by a processor associated with the second computing device perform the steps of the method of claim 16.

18. An apparatus, comprising:
in a communication network wherein a first computing device comprises user equipment and a second computing device comprises an authentication function for authenticating the user equipment, the first computing device comprising:
a memory; and
a processor coupled to the memory and configured to: send to the second computing device an authentication rejection message; send from the first computing device to the second computing device an emergency call indicator message; and initiate an emergency call in response to a decision at the second computing device regarding proceeding with or dropping an authentication procedure for the first computing device at the second computing device based on the receipt of the authentication rejection message and the emergency call indicator message.

* * * * *